US00RE41945E

(19) United States
(12) Reissued Patent
Downey

(10) Patent Number: US RE41,945 E
(45) Date of Reissued Patent: Nov. 23, 2010

(54) IMPACT SOUND INSULATION

(75) Inventor: Paul Charles Downey, Toronto (CA)

(73) Assignee: Ecore International Inc., Lancaster, PA (US)

(21) Appl. No.: 11/782,999

(22) Filed: Jul. 25, 2007

Related U.S. Patent Documents

Reissue of:
(64) Patent No.: 6,920,723
Issued: Jul. 26, 2005
Appl. No.: 09/931,320
Filed: Aug. 16, 2001

(51) Int. Cl.
*E04B 1/82* (2006.01)
*E04F 15/22* (2006.01)

(52) U.S. Cl. ..... 52/144; 52/403.1; 52/408; 181/284; 428/492

(58) Field of Classification Search ..... 52/144, 52/145, 403.1, 480, 408, 411, 746.1, 747.11; 181/284, 285, 286; 428/327, 329, 492
See application file for complete search history.

(56) References Cited

U.S. PATENT DOCUMENTS

| | | | |
|---|---|---|---|
| 205,271 | A | 5/1878 | Hyatt |
| 1,554,179 | A | 9/1925 | Trader |
| 1,940,105 | A | 12/1933 | Schmid |
| 2,001,916 | A | 5/1935 | Mazer |
| 2,077,617 | A | 4/1937 | Cramer |
| 2,290,622 | A | 7/1942 | Carter |
| 2,288,054 | A | 8/1942 | Walton |
| 2,337,525 | A | 12/1943 | Peik |
| 2,768,091 | A | 10/1956 | Cubberley |
| 2,821,254 | A | 1/1958 | Kernen |
| 2,940,887 | A | 6/1960 | Daly et al. |
| 3,026,224 | A | 3/1962 | Rogers, Jr. |
| 3,567,563 | A | 3/1971 | Haudenchild et al. |
| 3,579,941 | A | 5/1971 | Tibbals |

(Continued)

FOREIGN PATENT DOCUMENTS

| | | |
|---|---|---|
| DK | 41 41 023 A1 | 6/1993 |
| GB | 1120827 | 7/1968 |
| GB | 2 379 934 | 3/2003 |
| WO | WO 93/12283 | 6/1993 |
| WO | WO 2004/058416 A1 | 7/2004 |

OTHER PUBLICATIONS

Brochure: *Amorim Industrial Solutions* Acousticork Products.
Brochure: The Noble Company Nobleseal® SIS (Sound Isolation Sheet).
Test Data from 2000–2007 with 901 pages.

(Continued)

*Primary Examiner*—Richard E Chilcot, Jr.
*Assistant Examiner*—Mark R Wendell
(74) *Attorney, Agent, or Firm*—Oblon, Spivak, McClelland, Maier & Neustadt, L.L.P.

(57) ABSTRACT

A substrate for use in a flooring system which has a subfloor and a decorative upper layer. The substrate is made in a continuous sheet which has a bottom surface, a top surface, side surfaces and end surfaces. The top surface and the oppositely facing bottom surface are essentially parallel to each other and are spaced apart by the thickness of the substrate. Voids are provided in the substrate, the voids are provided between particles of rubber or other similar material. When the substrate is positioned between the subfloor and the decorative top layer, the particles of rubber provide the strength required to prevent deformation of the substrate in the direction of the thickness and the voids contribute to the sound dampening characteristics required to provide decibel reduction across the thickness of the substrate.

50 Claims, 2 Drawing Sheets

U.S. PATENT DOCUMENTS

| | | | | | |
|---|---|---|---|---|---|
| 3,770,560 | A | * | 11/1973 | Elder et al. | 428/138 |
| 3,917,501 | A | | 11/1975 | Ferucci et al. | |
| 3,948,009 | A | | 4/1976 | Bernhard | |
| 3,985,198 | A | | 10/1976 | Kurtze et al. | |
| 4,060,502 | A | | 11/1977 | Benton | |
| 4,112,176 | A | | 9/1978 | Bailey | |
| 4,143,495 | A | | 3/1979 | Hintz | |
| 4,685,259 | A | | 8/1987 | Eberhart et al. | |
| 4,694,627 | A | | 9/1987 | Omholt | |
| 4,753,841 | A | * | 6/1988 | Noel et al. | 428/174 |
| 4,860,506 | A | | 8/1989 | Yoshimi et al. | |
| 4,888,927 | A | | 12/1989 | Yoshimi et al. | |
| 4,917,932 | A | | 4/1990 | McClung | |
| 4,945,697 | A | | 8/1990 | Ott et al. | |
| 4,957,798 | A | | 9/1990 | Bogdany | |
| 5,187,905 | A | | 2/1993 | Pourtau et al. | |
| 5,258,222 | A | | 11/1993 | Crivelli | |
| 5,438,171 | A | | 8/1995 | Schmanski | |
| 5,527,409 | A | | 6/1996 | Lanphier | |
| 5,584,950 | A | | 12/1996 | Gaffigan | |
| 5,653,099 | A | | 8/1997 | MacKenzie | |
| 5,714,219 | A | | 2/1998 | Mashunkashey et al. | |
| 5,721,035 | A | | 2/1998 | Dunn | |
| 5,744,763 | A | | 4/1998 | Iwasa et al. | |
| 5,766,721 | A | | 6/1998 | Bussey, Jr. et al. | |
| 5,851,338 | A | | 12/1998 | Pushaw | |
| 5,867,957 | A | | 2/1999 | Holtrop | |
| 5,879,781 | A | | 3/1999 | Mehta et al. | |
| 5,956,921 | A | | 9/1999 | Fleck et al. | |
| 6,077,613 | A | | 6/2000 | Gaffigan | |
| 6,182,413 | B1 | | 2/2001 | Magnusson | |
| 6,212,838 | B1 | | 4/2001 | Eda | |
| 6,213,252 | B1 | | 4/2001 | Ducharme | |
| 6,224,707 | B1 | | 5/2001 | Lion | |
| 6,291,048 | B1 | | 9/2001 | Jerdee et al. | |
| 6,541,105 | B1 | | 4/2003 | Park | |
| 6,723,413 | B2 | | 4/2004 | Walters | |
| 6,796,096 | B1 | | 9/2004 | Heath | |
| 2002/0005250 | A1 | | 1/2002 | Jerdee et al. | |
| 2002/0015840 | A1 | | 2/2002 | Kakimoto et al. | |
| 2002/0074075 | A1 | | 6/2002 | Brown et al. | |
| 2002/0088193 | A1 | | 7/2002 | Reimers et al. | |
| 2003/0037508 | A1 | | 2/2003 | Kobayashi et al. | |
| 2004/0050482 | A1 | | 3/2004 | Abrams | |
| 2005/0031829 | A1 | | 2/2005 | Crenshaw et al. | |
| 2006/0008612 | A1 | | 1/2006 | Brazier et al. | |
| 2006/0016635 | A1 | | 1/2006 | Downey | |
| 2006/0105136 | A1 | | 5/2006 | Brazier et al. | |
| 2006/0151908 | A1 | | 7/2006 | Brazier et al. | |
| 2006/0165950 | A1 | | 7/2006 | Dodge, III | |
| 2007/0172629 | A1 | | 7/2007 | Dodge | |
| 2008/0010930 | A1 | * | 1/2008 | Mao | 52/403.1 |

OTHER PUBLICATIONS

Transcript of Deposition of Paul C. Downey, Apr. 24, 2008, pp. 46–49, 54–57, 106–109, and 134–137, Art Dodge, vol. II, Apr. 25, 2008, pp. 109–112, 117–128, 153–156, 165–180, 209–212, and 265–268, *Dodge–Regupol, Inc.* v. *RB Rubber Products, Inc.,* Case No. 3:06–CV–00236–UN2.

Transcript of Deposition of Paul C. Downey, vol. II, Apr. 24, 2008, pp. 199, 216–219, 272–275, 288–295, 364–367, and 468–471; *Dodge–Regupol, Inc.* v. *RB Rubber Products, Inc.,* Case No. 3:06–CV–00236–UN2.

Transcript of Deposition of Art Dodge, vol. II, Apr. 25, 2008, pp. 109–112, 117–128, 153–156, 165–180, 209–212, and 265–268; *Dodge–Regupol, Inc.* v. *RB Rubber Products, Inc.,* Case No. 3:06–CV–00236–UN2.

Exhibit 3 to the Deposition of Art Dodge, vol. II, Apr. 25, 2008, *Dodge–Regupol, Inc.* v. *RB Rubber Products, Inc.,* Case No. 3:06–CV–00236–UN2.

Exhibit 4 to the Deposition of Art Dodge, vol. II, Apr. 25, 2008, *Dodge–Regupol, Inc.* v. *RB Rubber Products, Inc.,* Case No. 3:06–CV–00236–UN2.

Exhibit 5, p. 4 of 6, to the Deposition of Art Dodge, vol. II, Apr. 25, 2008, *Dodge–Regupol, Inc.* v. *RB Rubber Products, Inc.,* Case No. 3:06–CV–00236–UN2.

Exhibit 6 to the Deposition of Art Dodge, vol. II, Apr. 25, 2008, *Dodge–Regupol, Inc.* v. *RB Rubber Products, Inc.,* Case No. 3:06–CV–00236–UN2.

Exhibit 17, p. 4 of 4, to the Deposition of Art Dodge, vol. II, Apr. 25, 2008, *Dodge–Regupol, Inc.* v. *RB Rubber Products, Inc.,* Case No. 3:06–CV–00236–UN2.

Exhibit 18 to the Deposition of Art Dodge, vol. II, Apr. 25, 2008, *Dodge–Regupol, Inc.* v. *RB Rubber Products, Inc.,* Case No. 3:06–CV–00236–UN2.

Exhibit 19 to the Deposition of Art Dodge, vol. II, Apr. 25, 2008, *Dodge–Regupol, Inc.* v. *RB Rubber Products, Inc.,* Case No. 3:06–CV–00236–UN2.

Exhibit 20 to the Deposition of Art Dodge, vol. II, Apr. 25, 2008, *Dodge–Regupol, Inc.* v. *RB Rubber Products, Inc.,* Case No. 3:06–CV–00236–UN2.

Exhibit 21 to the Deposition of Art Dodge, vol. II, Apr. 25, 2008, *Dodge–Regupol, Inc.* v. *RB Rubber Products, Inc.,* Case No. 3:06–CV–00236–UN2.

Brochure: PlayGuard® Playground Safety Surfacing. By Dodge Regupol, Inc.® pp.DR01066–DR01071 Jul. 2005.

Brochure: Pavesafe–Equine Safety Surfacing systems. By Dodge–Regupol, Inc.® pp.DR01072–DR01075 Apr. 2003.

Brochure: Innovators in Fitness and sport Surfacing. By Dodge–Regupol, Inc.® pp. DR01076–DR01079 Aug. 2002.

Brochure: Everlast–Performance Flooring. Manufactured by : Dodge–Regupol, Inc.® pp. DR01080–DR01091 Jul. 2006.

Letter dated Mar. 5, 2008 from Harness Dickey. Re: *Dodge–Regupol, Inc.* v. *RB Rubber Products, Inc.* Case No. 3:06cv236.

Case 3:06–cv–00236–JEJ, Document 48, (Markman Order) Filed Mar. 9, 2007, pp. 1–12.

U.S. District Court. Middle District of Pennsylvania (Scranton) Civil Docket for Case # 3:06–cv–00236–JEJ. 9 pages, date filed Jan. 31, 2006.

Deposition of Paul Downey, Jun. 27, 2007. pp. 1–198, Index, pp. 1–20.

Deposition of Paul Downey, Jun. 27, 2007, Exhibits 1, 3–7, 9–12.

Deposition of Paul Downey, Apr. 24, 2008, vol. II–pp. 199–275.

Downey Exhibits, 13–42, Jun. 27, 2007.

Deposition of Arthur Dodge, Jun. 27, 2007, pp. 1–75 .Index, pp. 1–10.

Dodge Exhibits, 1–2, Jun. 27, 2007.

Videotaped Deposition of Art Dodge, Apr. 25, 2008. vol. II—pp. 76–318. Index, pp. 1–21.

Dodge Deposition 2008. Exhibits 3–27, Jun. 27, 2007.

* cited by examiner

IMPACT SOUND INSULATION

Matter enclosed in heavy brackets [ ] appears in the original patent but forms no part of this reissue specification; matter printed in italics indicates the additions made by reissue.

FIELD OF THE INVENTION

The invention is directed to sound insulating material for use in flooring. In particular, a sound insulating material which exhibits the strength characteristics required to properly support the decorative top layer of the flooring.

BACKGROUND OF THE INVENTION

Ceramic, masonry, and wood tiles have been used for many years in the construction industry. These materials are used for many reasons including strength, durability, and appearance. However, despite their numerous desirable qualities, these materials typically exhibit poor acoustic properties. Poor sound or acoustic properties are extremely undesirable in all structure, but in particular in high-rise buildings which are used as office buildings, hotels, apartments, and the like. As the occupants of one floor do not want to be disturbed from the occupants of the floor above, it is typical to add insulating material between the subfloor and the decorative tiles. In fact, standards have been developed and modified to insure that sound is not transmitted. The ASTM Impact Sound related tests are E492-90 and E 989-89. Where noise codes exist, generally IIC50 is specified. These apply to either finished floors of wood, ceramic, tile, stone, marble, vinyl, carpet, laminate, or floating floors of gypsum, lightweight concrete, mortar beds, plywood, and backer board.

While the insulating material of the prior art dampens the impact sound transmission, several disadvantages have been associated with the use of the insulating material. There are currently a variety of impact sound insulating materials which achieve the impact sound dampening required. It is typical for these materials to utilize numerous air-filled cells, such as foams, a honeycomb construction, one or more fibrous layers, or a combination of these constructions. All of these have problems associated therewith. Increased thickness associated with these materials is a significant problem. The thicker the material, the greater thickness of the floor. Moreover, the increased thickness of the floor increases the overall height required for the building, thereby significantly increasing the cost of materials and construction.

Additionally, as many of the materials are designed to reduce impact sound, the structural stability of the material is weak. In other words, the material can easily be compressed when a force is applied thereto. Consequently, while the materials described above work well in ceilings and walls, structural support must be added in order for the insulating materials to be used in flooring systems. Without the support, the tiles would crack and deform as pressure is applied. The introduction of the support layer further adds to the height requirements, resulting in greater expense.

It would, therefore, be beneficial to provide an insulating member which provides the acoustic properties required while providing the structural support necessary to support the tiles. It would also be beneficial to provide the properties needed while minimizing the height required for the insulating member.

SUMMARY OF THE INVENTION

An object of the present invention is to provide an insulating material for use with decorative flooring tile and the like which minimizes the height required. Another object of the invention is to provide an insulating material which has the acoustic properties and the strength characteristics required to be used in a flooring system.

These and other objects are accomplished by the flooring system described herein. The flooring system has a subfloor, a decorative top layer, and a substrate provided therebetween. The substrate has a top surface and an oppositely facing bottom surface. The bottom surface positioned proximate the subfloor and the top surface is positioned proximate the decorative top layer. Voids are provided in the substrate which extend between the top surface and the bottom surface. The substrate is manufactured from rubber in sheets which are cut to the desired configuration. The substrate has the strength characteristics to support the decorative layer and prevent damage thereto and the sound dampening characteristics to provide decibel reduction through the substrate.

The invention is also directed to a substrate for use in a flooring system which has a subfloor and a decorative upper layer. The substrate is made in a sheet which has a bottom surface, a top surface, side surfaces and end surfaces. The top surface and the oppositely facing bottom surface are essentially parallel to each other and are spaced apart by the thickness of the substrate. Voids are provided in the substrate, the voids are provided between particles of rubber or other similar material. When the substrate is positioned between the subfloor and the decorative top layer, the particles of rubber provide the strength required to prevent deformation of the substrate in the direction of the thickness and the voids contribute to the sound dampening characteristics required to provide decibel reduction across the thickness of the substrate.

DETAILED DESCRIPTION OF THE EMBODIMENT SHOWN

Figure 3:
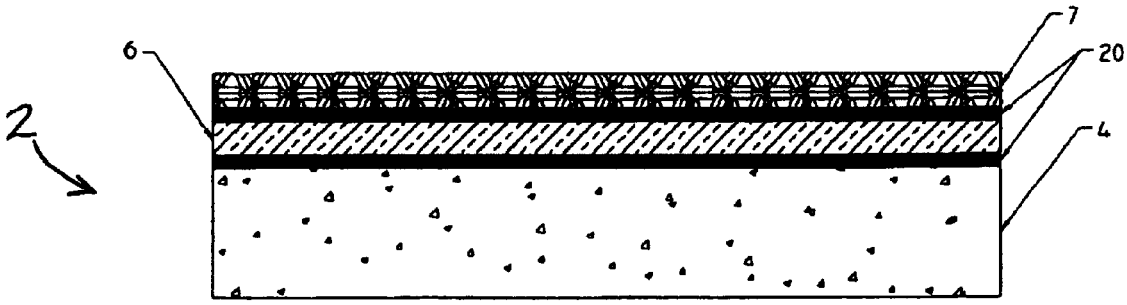
FIG. 3 is a cross sectional view of a flooring system in which the substrate of FIG. 1 is incorporated.

Referring to FIG. 3, a flooring system 2 according to the present invention is shown. The flooring system 2 has a base or subfloor 4. The subfloor 4 is an integral part of the building or structure and can be in the form of a concrete slab, plywood floor, or any other known material commonly used in the building industry. Positioned above the subfloor is a sound absorbing substrate 6 and decorative top layer 7. The sound absorbing substrate 6 may be affixed to the subfloor 4 and/or the decorative top layer 7 by means of mastic or glue layers 20. As the use of mastics or glues are well known in the industry, a further explanation of the glue will not be provided.

The decorative top layer may be wood, linoleum, ceramic tile, carpet, or any other known flooring. Individual components of the decorative top layer 7 are positioned in place and secured to each other by frictional engagement, glue, grout, or other conventional means. As decorative flooring is commonly used, a further explanation of the specifics relating to the decorative top layer 7 will not be provided.

Figure 1:
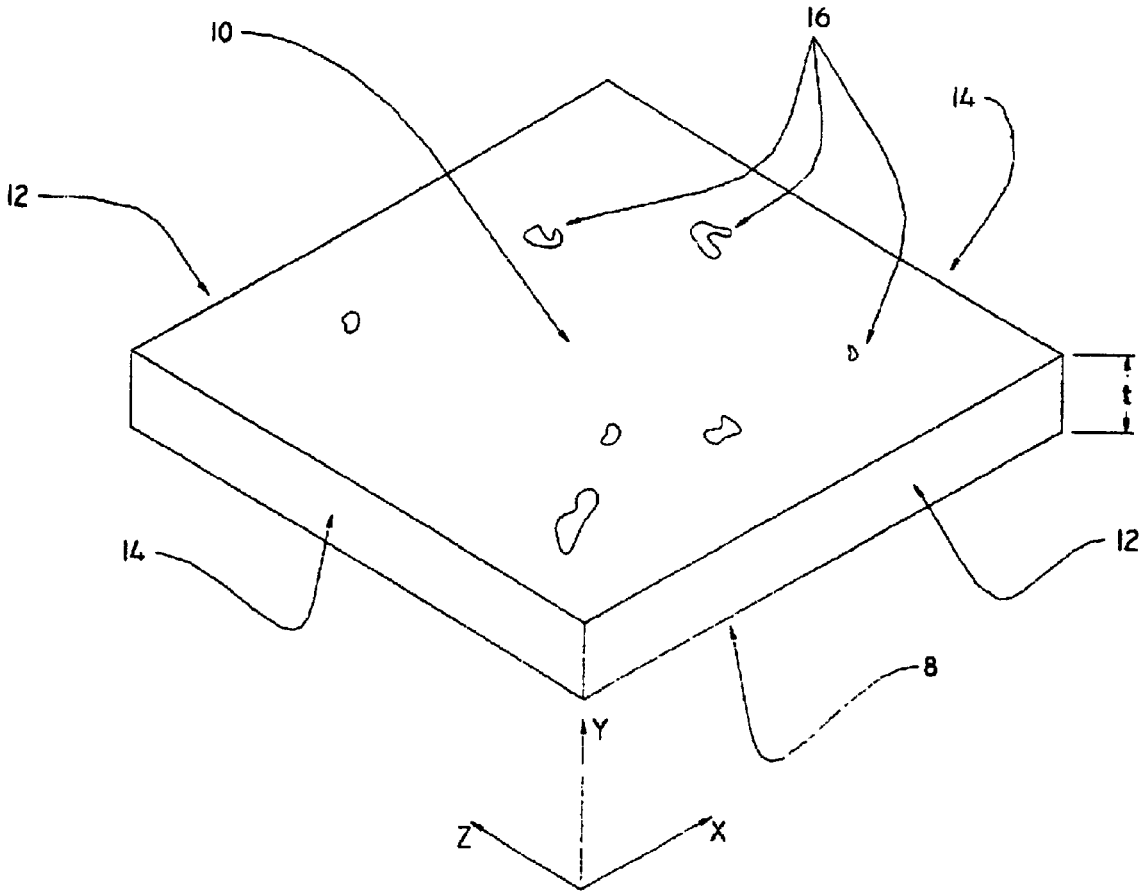
FIG. 1 is a perspective view of a substrate according to the present invention.
Figure 2:
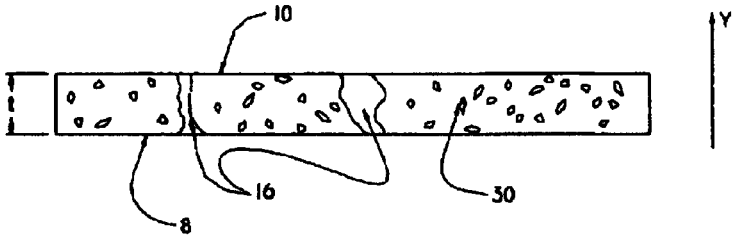
FIG. 2 is an enlarged cross sectional view of the substrate of FIG. 1.

Referring to FIGS. 1 and 2, the substrate 6 has a bottom surface 8, a top surface 10, side surfaces 12 and end surfaces 14. The top surface 10 and the oppositely facing bottom surface 8 are essentially parallel to each other and are spaced from each other by a distance or thickness t. The side surfaces 12 are spaced from each other and are essentially parallel to each other. End surfaces 14 are cut to conform to the shape required for the particular application. As the substrate is manufactured in continuous sheets, the length of the substrate will be governed by the particular installation. This provides maximum flexibility to the installer of the substrate. The use of a continuous sheet of substrate provides advantages which will be more fully described below. Voids 16 are provided in the substrate 6 and are randomly positioned in the substrate. The size and configuration of respective voids is also random.

In the embodiment shown the substrate 6 is manufactured from recycled rubber. During the manufacturing process SBR and natural rubber are mixed with a polyurethane and cured under moderate temperature to form a large cylindrical member of the rubber. In order to provide a continuous sheet of the substrate 6, the substrate 6 is cut from a cylindrical member. As the cylindrical member is rotated, blades engage an outside layer of the cylindrical member and cause the outside layer to be cut away from the cylindrical member, thereby forming a continuous sheet of the substrate 6. This process of manufacturing the substrate is significantly different than the vulcanized method generally used to manufacture substrates of this type. Therefore, the substrate of the present invention has greater resiliency, as will be more fully discussed below. Although the embodiment shown has a large percentage of SBR rubber therein, the substrate 6 can be made of SBR rubber, other rubbers, or any combination thereof.

During installation of the flooring system, at least one continuous sheet of the substrate 6 is brought to the job and cut to the appropriate length. As the rubber material of the present invention has not been vulcanized, the rubber material has the flexibility required to allow the rubber material to be delivered in rolls of sheets. With the substrate 6 cut to the proper length, the substrate is positioned over and covers the subfloor 4. As each sheet of the substrate 6 is generally four feet wide, several sheets of substrate may be required to fully cover the subfloor 4. The use of continuous sheets eliminates many of the seams found in the prior art. Previously, individual pieces of some type of substrate would be positioned on the subfloor. The use of many rectangular pieces requires many seams which are difficult to align precisely, thereby causing gaps to be provided therebetween. The use of the sheets minimizes this problem.

The substrate 6 may or may not be glued or secured to the subfloor 4. If glue or adhesive 20 or the like is to be used, the glue is generally applied to the subfloor prior to the substrate being finally positioned thereon. As the substrate 6 is in the form of continuous sheets, the weight of the sheets and their frictional interface with the subfloor is generally sufficient to maintain the substrate in position, thereby eliminating the need for glue 20 or the like.

With the substrate 6 properly positioned on the subfloor 4, the decorative top layer 7 can be installed. Depending on the material used for the decorative top layer, the material may or may not be glued or secured to the substrate. If glue or adhesive 20 is to be used, the glue is generally applied in small areas and the decorative top layer is installed thereon. This process is repeated until the entire decorative top layer is installed.

In the embodiment shown, the substrate 6 has a density of below 1000 kilograms per meter cubed and a decibel reduction of approximately 20 dB for a substrate having a thickness of 5 mm and 25 dB for a substrate having a thickness of 10 mm. However, the density and thickness of the substrate 6 may be varied according to the particular application. Consequently, the density and material of the substrate are important to the overall effectiveness of the flooring system. The flooring system must have the structural integrity to prevent cracking or breaking of the decorative upper layer. Generally, in order to achieve the maximum structural integrity, the substrate should be as rigid as possible. In fact in many of the previous flooring systems, extra support members are provided to enhance the rigidity characteristics of the substrate. However, the substrate must also have the ability to dampen the sound and provide the appropriate decibel reduction. In order to achieve this result, the prior art teaches of sound dampening materials used in the substrate. These materials generally have air voids and the like to dampen the sound, which lessens the rigidity of the substrate. Therefore, prior art substrates are either extremely thick or require the use of a separate support member to provide the strength and/or sound dampening characteristics required.

In contrast, the substrate 6 of the present invention is configured to achieve the sound dampening and strength requirements with a relatively thin cross section and without the need for an additional support member. As the substrate 6 is manufactured as described above, the rubber provides the structural integrity required. Although the substrate is flexible, when a force is applied to the top surface 10 of the substrate 6, the rubber particles 30 will compress only a relatively small amount. Therefore, as the compression of the substrate in the y direction is not great, the movement of the decorative upper layer 7 in the y direction is also not significant. Consequently, the likelihood of damage to the upper layer because of cracking and the like is essentially eliminated. However, the substrate 6 also has the sound dampening characteristics required. As the manufacturing process provides random voids 16 between the particles of rubber, the configuration of the substrate 6 dampens the sound.

The use of substrate 6 has various advantages over the prior art. Unlike other materials used to dampen sound, the rubber sheets are highly elastic with long lasting flexibility. The material does not wear, harden, or grow bittle over time. Consequently, as the substrate maintains its integrity and characteristics over time, the decorative top layer 7 does not wear as quickly and thereby extends the life of the top layer 7.

The rubber substrate 6 is also moisture insensitive compared to other materials such as cork. Therefore, in environments where the floor system is exposed to liquids, the performance of the rubber substrate 6 will be unaffected by the liquid and will not degrade over time.

As described, the use of sheets provides a solid surface on which the top layer is positioned. In previous systems, the substrate would be made from numerous squares (or rectangles) which would be positioned in abutting relationship. If any of the individual pieces were not properly aligned, a gap or space would be provided between the pieces. While the top layer positioned over the spaces, the spaces would not properly support the top layer, creating a weak area in which the top layer could crack over time.

The use of the rubber substrate 6 also allows radiant heat to be positioned in the floor. As the rubber is stable over a range of temperatures, the present invention can be used with radiant heat systems. Many other sound dampening materials would not be adaptable with radiant heat.

As the substrate does not require additional support members and as the thickness of the substrate can be minimized to accommodate the particular application, the use of the substrate minimizes the overall height of the flooring system. This can be an extremely important factor in reducing the cost to construct a building or the like. When compared with conventional flooring system currently used, the use of the flooring system described herein can eliminate approximately 13 to 14 millimeters of height. As the thickness of the substrate is minimized and as no additional members are required, the use of the substrate 6 reduces the space required. This reduction of height required for the flooring system is particularly significant in multi-story or high rise buildings. In these buildings, a reduction of a meter or less in height reduces the amount of building material used and is a significant cost savings.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A flooring system comprising:

a subfloor;

a decorative top layer;

a substrate having a top surface and an oppositely facing bottom surface, the bottom surface positioned proximate the subfloor and the top surface is positioned proximate the decorative top layer, the substrate having a thickness of about 10 mm and voids which extend between the top surface and the bottom surface, the substrate is manufactured from rubber in sheets which are cut to the desired configuration;

whereby the substrate has the strength characteristics to support the decorative layer and prevent damage thereto and the sound dampening characteristics to provide decibel reduction through the substrate.

2. The flooring system as recited in claim 1 wherein the density of the substrate is less than 1000 kilograms per meter cubed.

3. The flooring system as recited in claim 1 wherein the substrate has the strength characteristics required to support the decorative layer while having sufficient resiliency to allow the substrate to be delivered in rolls.

4. The flooring system as recited in claim 1 wherein the substrate is fixed to the subfloor by means of an adhesive.

5. The flooring system as recited in claim 1 wherein the substrate is fixed to the decorative top layer by means of an adhesive.

6. The flooring system as recited in claim 1 wherein the substrate is made from an SBR rubber material.

7. The flooring system as recited in claim 1 wherein the sound damping characteristics exhibit a decibel reduction of approximately 20 dB for a substrate with a thickness of 5 mm.

8. A substrate for use in a flooring system which has a subfloor and a decorative upper layer, the substrate comprising of:

a continuous sheet having a bottom surface configured for frictional interface with the subfloor, a top surface configured for receiving the decorative upper layer, side surfaces and end surfaces, the top surface and the oppositely facing bottom surface are essentially parallel to each other and are spaced apart by the thickness of the substrate, the thickness of the substrate being about 10 mm;

an adhesive located on the bottom surface for fixing the substrate to the subfloor;

voids are provided in the substrate, the voids are provided between particles of material of the substrate, such that the particles of material provide the strength required to prevent deformation of the substrate in the direction of the thickness and the voids contribute to the sound dampening characteristics required to provide decibel reduction across the thickness of the substrate; and the top surface has an adhesive for fixing the substrate to the decorative upper layer.

9. The substrate for use in a flooring system as recited in claim 8 wherein the continuous sheet is cut to the appropriate length to fit the space requirements.

10. The substrate for use in a flooring system as recited in claim 8 wherein the density of the substrate is less than 1000 kilograms per meter cubed.

11. The substrate for use in a flooring system as recited in claim 8 wherein the substrate has the strength characteristics required to support the decorative layer while having sufficient resiliency to allow the substrate to be delivered in rolls.

12. The substrate for use in a flooring system as recited in claim 8 wherein the substrate is made from an SBR rubber material.

13. The substrate for use in a flooring system as recited in claim 8 wherein the sound dampening characteristics exhibit a decibel reduction of approximately 20 dB for a substrate with a thickness of 5 mm.

14. The flooring system as recited in claim 1 wherein the rubber is formed in a cylindrical member and the sheets are cut from the cylindrical member.

15. The substrate for use in a flooring system as recited in claim 8 wherein the continuous sheet is cut from a cylindrical member.

16. The substrate for use in a flooring system as recited in claim 8 wherein the substrate includes a binder and particles of rubber, the binder and the particles of rubber being partially severed at the top surface and the bottom surface of the continuous sheet.

*17. A flooring system comprising:*

*a subfloor;*

*a decorative top layer; and*

*a rubber substrate having a density of below 1000 kilograms per meter cubed and a top surface and an oppositely facing bottom surface, the bottom surface positioned proximate the subfloor and the top surface positioned proximate the decorative top layer, the substrate having voids which extend between the top surface and the bottom surface,*

*wherein the substrate:*

*is manufactured from rubber in sheets which are cut to the desired configuration, has strength characteristics to support the decorative layer and prevent damage thereto, and wherein the flooring system:*

*has sound dampening characteristics to provide decibel reduction through the substrate of about 20 dB for a substrate having a thickness of 5 mm and about 25 dB for a substrate having a thickness of 10 mm; and*

*wherein the substrate is fixed to the decorative top layer by means of an adhesive.*

*18. The flooring system as recited in claim 17, wherein the substrate has the strength characteristics required to support the decorative layer while having sufficient resiliency to allow the substrate to be delivered in rolls.*

*19. The flooring system as recited in claim 17, wherein the substrate is fixed to the subfloor by means of an adhesive.*

*20. The flooring system as recited in claim 17, wherein the substrate comprises an SBR rubber material.*

*21. The flooring system as recited in claim 17, wherein said rubber substrate comprises rubber and polyurethane.*

*22. A method for installation of a flooring system comprising a subfloor, a rubber substrate, and a decorative top layer, said method comprising:*

*cutting a continuous sheet of said rubber substrate to a desired length; and*

*positioning the substrate over a subfloor,*

*wherein the rubber substrate has a density of below 1000 kilograms per meter cubed and a top surface and an oppositely facing bottom surface, the rubber substrate having voids which extend between the top surface and the bottom surface and strength characteristics to support a decorative layer and prevent damage thereto,*

*said flooring system having sound dampening characteristics to provide decibel reduction through the substrate of about 20 dB for a substrate having a thickness of 5 mm and about 25 dB for a substrate having a thickness of 10 mm; and*

*wherein the substrate is fixed to the decorative top layer by means of an adhesive.*

*23. The method as recited in claim 22, wherein the substrate has the strength characteristics required to support the decorative layer while having sufficient resiliency to allow the substrate to be delivered in rolls.*

*24. The method as recited in claim 22, wherein the substrate is fixed to the subfloor by means of an adhesive.*

*25. The method as recited in claim 22, wherein the substrate comprises an SBR rubber material.*

*26. The method as recited in claim 22, wherein said rubber substrate comprises rubber and polyurethane.*

*27. The method according to claim 22, further comprising positioning a decorative layer on the rubber substrate.*

*28. The method according to claim 27, wherein the positioning a decorative layer includes positioning the decorative layer directly on the rubber substrate.*

*29. The method according to claim 22, further comprising providing the continuous sheet of rubber substrate in the form of a rolled sheet.*

*30. The method according to claim 29, wherein the providing the continuous sheet of rubber substrate in the form of a rolled sheet includes providing a rolled sheet that is four feet wide.*

*31. The method according to claim 29, wherein the providing a continuous sheet of a rubber substrate includes providing a non-vulcanized rubber substrate.*

*32. A rubber substrate for use in a flooring system which has a subfloor and a decorative upper layer, the substrate comprising:*

*a continuous rubber sheet having a density of less than 1000 kilograms per meter cubed comprising rubber and polyurethane and having a bottom surface configured for frictional interface with the subfloor, a top surface configured for receiving the decorative upper layer, side surfaces and end surfaces, the top surface and the oppositely facing bottom surface being essentially parallel to each other and spaced apart by the thickness of the substrate, the rubber sheet being non-vulcanized and having adhesive located on the bottom surface thereof for fixing the substrate to the subfloor; wherein voids are provided in the rubber sheet between particles of rubber such that the particles provide the strength required to prevent deformation of the substrate in the direction of the thickness and the voids contribute to the sound dampening characteristics required to provide decibel reduction across the thickness of the substrate; and the top surface has an adhesive for fixing the substrate to the decorative upper layer.*

*33. The substrate for use in a flooring system as recited in claim 32, wherein the continuous sheet is cut to the appropriate length to fit the space requirements.*

*34. The substrate for use in a flooring system as recited in claim 32, wherein the substrate has the strength characteristics required to support the decorative layer while having sufficient resiliency to allow the substrate to be delivered in rolls.*

*35. The substrate for use in a flooring system as recited in claim 32 wherein the substrate comprises an SBR rubber material.*

*36. A method for installing a flooring system comprising a subfloor, a decorative top layer, and a substrate having a top surface and an oppositely facing bottom surface, said method comprising:*

*positioning the bottom surface of the substrate proximate the subfloor, the substrate having voids which extend between the top surface and the bottom surface, the substrate being manufactured from rubber in sheets which are cut to the desired configuration and having strength characteristics to support the decorative layer and prevent damage thereto and sound dampening characteristics to provide decibel reduction through the substrate; and positioning the decorative top layer proximate the top surface of the substrate,*

*wherein the substrate is fixed to the decorative top layer by means of an adhesive.*

*37. The method as recited in claim 36, wherein the density of the substrate is less than 1000 kilograms per meter cubed.*

*38. The method as recited in claim 36, wherein the substrate has the strength characteristics required to support the decorative layer while having sufficient resiliency to allow the substrate to be delivered in rolls.*

*39. The method as recited in claim 36, wherein the substrate is fixed to the subfloor by means of an adhesive.*

*40. The method as recited in claim 36, wherein the substrate comprises an SBR rubber material.*

*41. The method as recited in claim 36, wherein the sound dampening characteristics exhibit a decibel reduction of about 20 dB for a substrate with a thickness of 5 mm.*

*42. The method as recited in claim 36, wherein the substrate comprises rubber and polyurethane.*

*43. The method as recited in claim 36, wherein the voids are provided between particles of rubber.*

*44. The method as recited in claim 36, wherein said substrate comprises rubber and polyurethane.*

*45. The method according to claim 36, further comprising providing the substrate in the form of a rolled sheet.*

*46. The method according to claim 45, wherein the rolled sheet is four feet wide.*

*47. The method as recited in claim 36, wherein the sound dampening characteristics exhibit a decibel reduction of about 25 dB for a substrate with a thickness of 10 mm.*

*48. The method as recited in claim 36, wherein the flooring system has sound dampening characteristics providing a decibel reduction of about 20 dB for a substrate having a thickness of 5 mm and about 25 dB for a substrate having a thickness of 10 mm.*

*49. The method according to claim 36, wherein the positioning a decorative layer includes positioning the decorative layer directly on the substrate.*

*50. The method according to claim 36, wherein the substrate is a non-vulcanized substrate.*

* * * * *